Jan. 31, 1928.  1,657,925
T. HARKINS ET AL
RUNNER ATTACHMENT FOR VEHICLES
Filed March 9, 1927  2 Sheets-Sheet 1
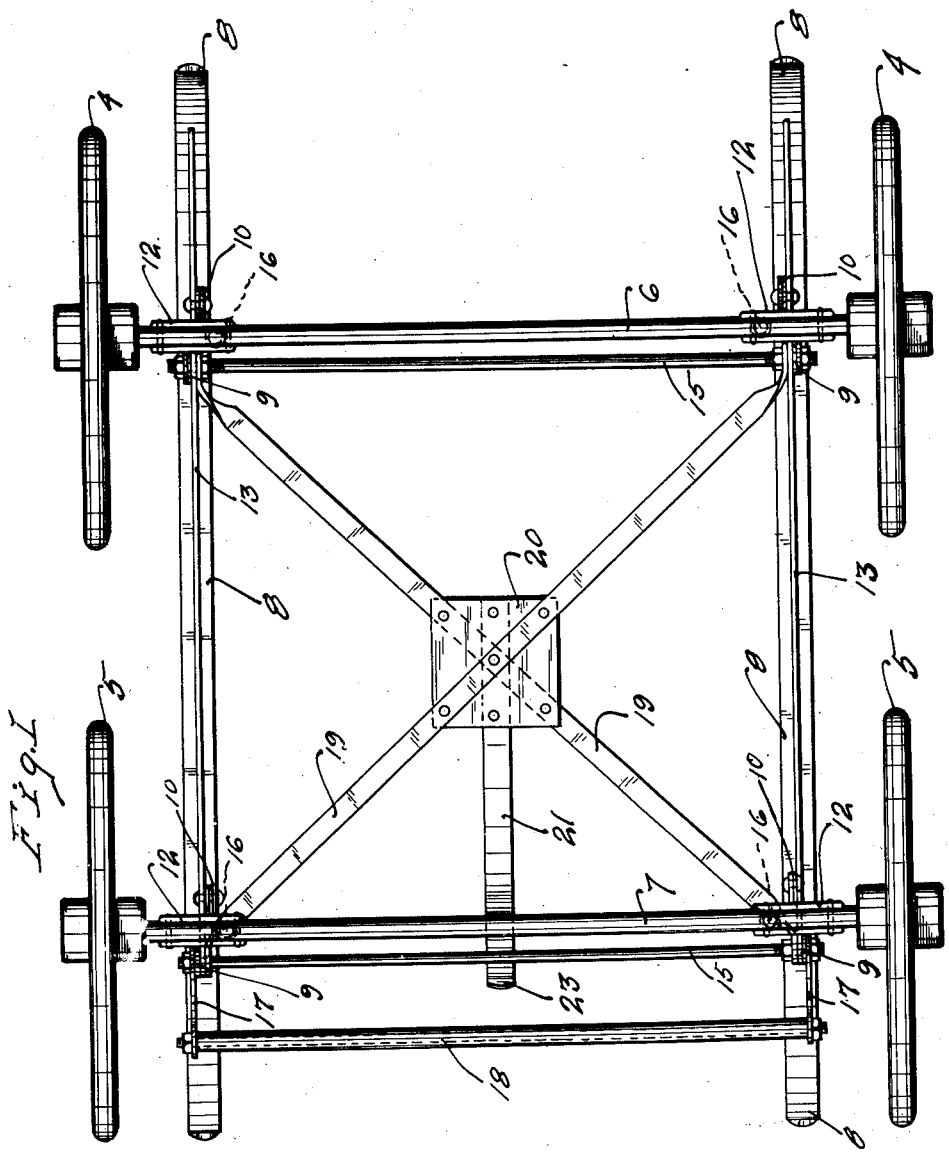
Inventors
Thomas Harkins
Nels Olson

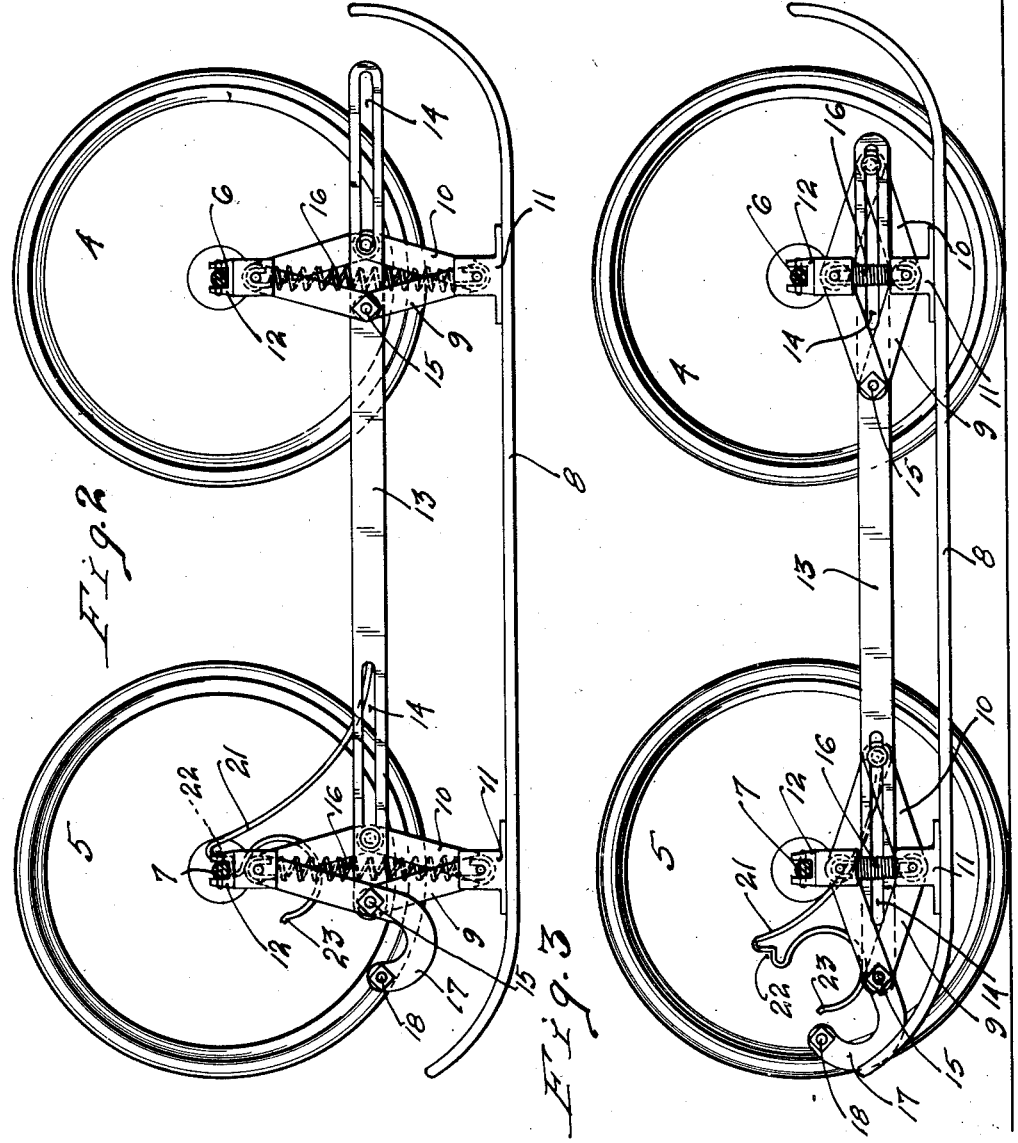

Patented Jan. 31, 1928.

1,657,925

UNITED STATES PATENT OFFICE.

THOMAS HARKINS, OF MINNEAPOLIS, AND NELS OLSON, OF ST. PAUL, MINNESOTA.

RUNNER ATTACHMENT FOR VEHICLES.

Application filed March 9, 1927. Serial No. 173,863.

Our invention has for its object to provide a simple and highly efficient runner attachment for vehicles and is especially well adapted for baby carriages.

Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention applied to the front and rear wheel-equipped axles of a baby carriage;

Fig. 2 is a right side elevation of the same with the runners in operative positions; and Fig. 3 is a view corresponding to Fig. 2 showing the runners in inoperative positions.

Of the parts of the baby carriage illustrated, the numerals 4 and 5 indicate, respectively, the front and rear pairs of wheels, and the numerals 6 and 7 indicate, respectively, the axles therefor.

The runner attachment includes a pair of runners 8 located just inside of the wheels 5 and having upwardly curved ends. Each runner 8 is provided with front and rear pairs of upright reversely-acting toggle levers 9 and 10, the lower ends of which are pivoted to brackets 11 on said runner, and the upper ends of which are pivoted to channel members 12 which afford open seats for the axles 6 and 7.

The toggle levers 9 on each runner 8 are connected for common movement by a link 13 to which said toggle levers are pivoted at their intermediate joints. The toggle levers 10 have pivot pins at their intermediate joints mounted in longitudinally extended slots 14 in said links for pivotal and sliding movement.

Front and rear transverse rods 15 connect the two links 13 and afford the pivotal connections for the intermediate joints of the toggles 9 with the links 13. The toggle levers 9 and 10 of each pair are yieldingly held buckled by a coil spring 16, one end of which is attached to the pivot pin connecting said toggle levers to the respective bracket 11, and the other end of which is attached to the pivot pin connecting said levers to the respective channel member 12. The upper members of the rear toggle levers 9 have rearwardly and upwardly curved extensions 17 connected by a foot rod 18.

A pair of crossed tiebars 19 have their ends connected to the rods 15 at the links 13 and rigidly hold said links parallel and against endwise movement. A reenforcing plate 20 connects the crossed bars 19 at their point of intersection.

Normally the springs 16 hold the toggle levers 9 and 10 buckled with the runners 8 raised above the roadbed so that the vehicle wheels will be in contact with the ground, as shown in Fig. 3. To move the runners 8 into operative positions below the bottoms of the wheels 4 and 5 so that the runners 8 will be in contact with the roadbed, the operator places his foot on the foot rod 18 and presses the same downward, to straighten the levers 9 and 10 by means of the links 13, and against the tension of the springs 16, as shown in Fig. 2.

To lock the toggle levers 9 and 10 straightened with the runners 8 in operative positions, there is secured to the crossed tiebars 19 a reenforcing plate 20, a rearwardly extended spring latch 21 having a rear axle seat 22, and a foot piece 23.

To mount the baby carriage on the runner attachment, the axles 6 and 7 are placed in the channel members 12 and secured by rivets or other fastening devices 24. In this position of the attachment, the spring latch 21 extends under the rear axle 7, as shown in Fig. 3. During the straightening movement of the toggle levers 9 and 10 the spring latch 21 engages the rear axle 7 and thereby cams said latch under said axle until the same is released therefrom, at which time said latch will fly upward and cause its rear axle seat 22 to interlock with the rear axle 7, as shown in Fig. 2. To release the spring latch 21 from the rear axle 7, it is only necessary for the operator to place his foot on the foot piece 23 and press downward until the seat 22 is below the rear axle 7.

From the above description, it is evident that the runner attachment may be very quickly applied to the running gear of a baby carriage or removed therefrom. It is also an extremely simple matter to move the runners into operative or inoperative positions so that part of the time the baby carriage may be operated as a wheeled vehicle and at other times as a sled; for instance, the baby carriage can be wheeled in the house or down a flight of stairs or steps and then the runners moved into operative positions so that the baby carriage may be used as a sled.

What we claim is:

1. A runner attachment for vehicles comprising a runner, a pair of reversely-acting upright toggle levers having their lower ends attached to the runner, means on the upper ends of said toggle levers for attaching the same to a vehicle, and a spring operative to buckle the toggle levers and hold the same inoperative, one of the links of one of the toggle levers, at its intermediate joint, being provided with a foot-piece-equipped extension.

2. A runner attachment for vehicles comprising a runner, two pairs of reversely-acting upright toggle levers having their lower ends attached to the runner, means on the upper ends of the pairs of toggle levers for attaching the same to a vehicle, springs operative to buckle the toggle levers to hold the same inoperative, and a link to which one toggle lever of each pair at its intermediate joint is pivotally attached and to which the other toggle lever of each pair is attached for pivotal and sliding movement.

3. A runner attachment for vehicles comprising a pair of laterally spaced runners, two pairs of reversely acting toggle levers on each runner, said pairs of toggle levers having their lower ends attached to the runners, means on the upper ends of the pairs of toggle levers for attaching the same to a vehicle, springs operative to buckle the toggle levers and hold the same inoperative, a pair of laterally spaced links, the two pairs of toggle levers for each runner having one of their toggle levers at their intermediate joints pivotally attached to one of the links and the other toggle levers of said pairs at their intermediate joints being attached to said link for pivotal and sliding movement.

4. The structure defined in claim 3 in further combination with a foot bar connecting the two links and operative when moved in one direction to straighten the toggle levers to move the runners into operative positions.

5. The structure defined in claim 3 in which one of the opposite pairs of toggle levers have extensions at their intermediate joints on one of their arms, and a foot bar attached to said extensions and operative when moved in one direction to straighten the toggle levers and move the runners into operative positions.

6. The structure defined in claim 3 in further combination with a spring latch attached to the links and arranged to engage one of the axles of the vehicle and be cammed into a position in which it will spring into interlocking engagement with said axle during the straightening movement of the toggle levers and hold said toggle levers with the runners in operative positions.

7. The structure defined in claim 3 in further combination with a spring latch attached to the links and arranged to engage one of the axles of the vehicle and be cammed into a position in which it will spring into interlocking engagement with said axle during the straightening movement of the toggle levers and hold said toggle levers with the runners in operative positions, and a foot piece on the spring latch for releasing the same.

In testimony whereof we affix our signatures.

THOMAS HARKINS.
NELS OLSON.